United States Patent Office.

HERMANN LEHRENKRAUSS, OF STUTTGART, WÜRTEMBERG, GERMANY.

METHOD OF PREPARING EXTRACTS FROM CEREALS.

SPECIFICATION forming part of Letters Patent No. 312,869, dated February 24, 1885.

Application filed November 13, 1884. (No specimens.)

*To all whom it may concern:*

Be it known that I, HERMANN LEHRENKRAUSS, a citizen of Germany, residing at Stuttgart, Würtemberg, Germany, have invented new and useful Improvements in Methods of Preparing an Extract from Cereals, of which the following is a specification.

This invention relates to a new or improved process of manufacturing from cereals and pulse an extract containing nutritious value of the seeds without the coarse fibers, the extract being gained from the bran and similar covering, said extract being for use in bakers' and confectioners' articles, soups, &c.

By the ordinary method of preparing flour or meal from cereals and pulse for the making of bread and the lighter kinds of fancy pastry, only one part of the corn or pulse—namely, the white, half-white, or black flour—is usually employed; and in the so-called "Graham bread" or coarse bread, wherein all the component parts of the grain are used, there is, even in the finer qualities, a coarse fiber, which, though ground very fine, is, from its flinty nature, found to cause great irritation of the intestines. The soluble extract matter of the bran contains very valuable nutriment; and the object of this invention is the preparation of an extract containing all the nutritious parts of the corn without the injurious bran fibers.

The essential novelties of the invention are—

First. That in articles made with the corn extract obtained by this improved process only the extract matter of the bran is added to the pastry.

Second. By the usual process of grinding, the bran is ground so fine as to render it very difficult to separate the coarser fibers therefrom. In order to effect this I proceed as follows: The grain, after cleaning, is moistened with just sufficient water and allowed to stand long enough to soften the adherent coating of bran, so that the same, by subsequent milling, will be removed in large flakes. The bran obtained in this way is freed as much as possible of the starch contained, and then mixed with five times its proportion of water and boiled down in a kettle or steam-boiler until the extraction is completed. The coarse fibers are separated from the extract by pressing it through flannel. The glutinous extract thus obtained is thickened by condensation to the consistence of sirup, and may be kept in bottles or jars until required for use in the preparation of pastry, &c.

Third. The following is the method of rendering light the pastry or articles made with the preparation without fermentation. By completely and thoroughly mixing and working the corn extract with flour, (and in the case of pastry, &c., with the other ingredients used,) small bubbles of air and water are formed in the mass, which, by heat in the process of baking, expand, and so make the bread or other articles light as desired. With fermentation: the corn extract, with some flour, is stirred in lukewarm water and left to ferment under heat, which very soon takes place, when it will be used in making dough.

Having thus described my invention, what I claim is—

The process herein described of making from cereals and pulse an extract containing the nutritious portions of the grain without the coarse fiber, which consists in first cleaning and soaking the grain sufficiently long to soften the bran coating, then removing such coating in flakes, then boiling the bran deprived of starch to extract the nutritious portions thereof, then straining the mixture to remove the coarse fibers, and finally condensing the glutinous extract, for the purposes set forth.

In testimony whereof I have set my hand in the presence of two subscribing witnesses.

HERMANN LEHRENKRAUSS.

Witnesses:
EDUARD RETTIETZ,
C. L. JUL. BAUMANN.